Nov. 13, 1934.  J. J. KENNEY  1,980,624
THERMOSTATIC VALVE
Filed Dec. 8, 1930
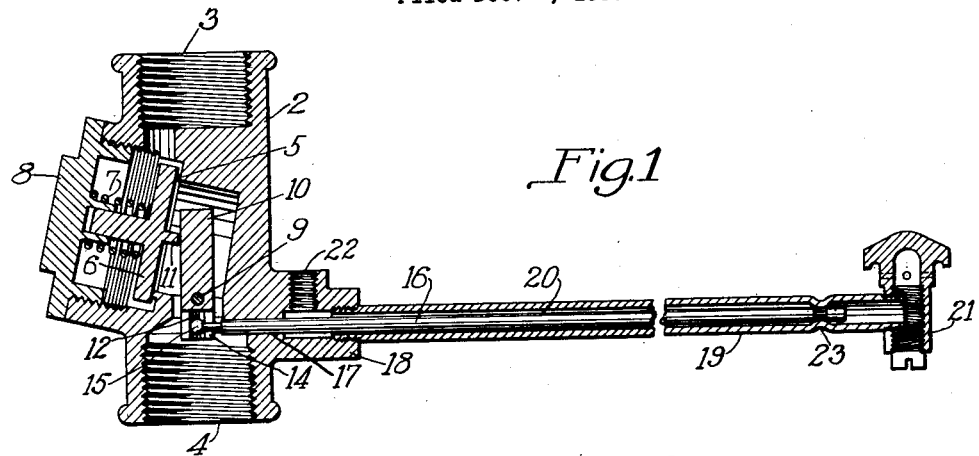
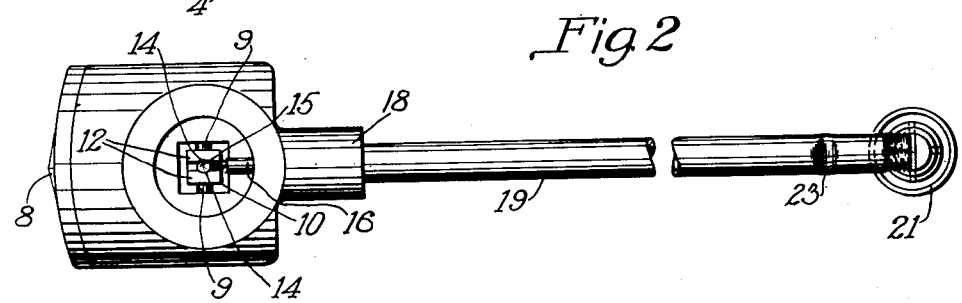
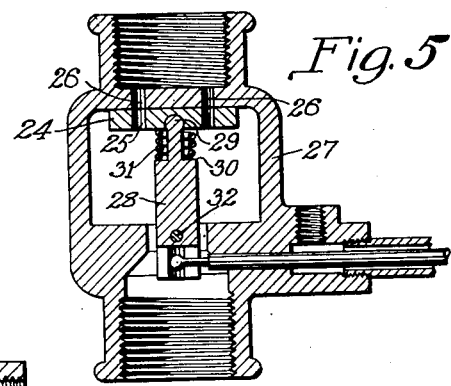
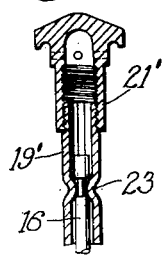
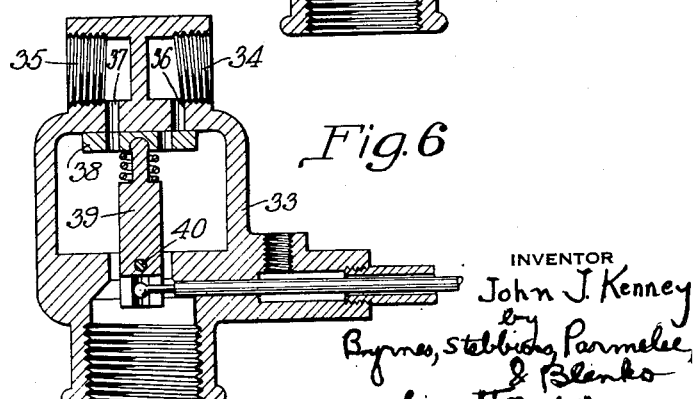
INVENTOR
John J. Kenney
by Byrnes, Stebbing, Parmelee & Blenko
his attorneys Patented Nov. 13, 1934

1,980,624

UNITED STATES PATENT OFFICE 1,980,624

THERMOSTATIC VALVE

John J. Kenney, Pittsburgh, Pa.

Application December 8, 1930, Serial No. 500,756

4 Claims. (Cl. 158—117.1)

The present invention relates broadly to the art of fluid distribution, and more particularly to a valve of the heat responsive type especially adaptable to the handling and control of combustible fluids, such as gas, although the utility of the invention is not limited with respect to the particular fluid being controlled.

In the distribution of gas, for example, it is frequently desirable to provide a suitable form of control mechanism such that when a predetermined flame condition is not maintained, the main supply of fluid will be cut off. As a specific illustration, it is desirable in many cases to make such provision in order to ensure that the main supply of gas cannot be delivered to the burners themselves in case the pilot is extinguished.

In the accompanying drawing I have illustrated my invention as applied to a control mechanism of this type, although it will be understood that the features herein disclosed may be utilized with thermostats of a wide variety of different types and adapted for use under different operating conditions.

The invention has for one of its objects the provision of an improved mechanism by means of which an operative connection is provided between the heat responsive means and the movable means controlled thereby regardless of the particular construction of either of such means.

In the accompanying drawing I have shown for purposes of illustration only, certain preferred embodiments of my invention. In the drawing:

Figure 1 is a longitudinal sectional view through a valve constructed in accordance with my invention;

Figure 2 is a bottom plan view of the valve illustrated in Figure 1;

Figure 3 is a front elevational view of the valve with certain of the parts omitted therefrom;

Figure 4 is a partial view similar to Figure 1 showing the parts in slightly different position;

Figure 5 is a view similar to Figure 1 illustrating another embodiment of the invention; and Figure 6 is a view similar to Figure 5 illustrating a mixing type valve.

In accordance with the present invention there may be provided a valve body or casing 2 having an inlet connection 3 and an outlet connection 4. Intermediate the inlet and outlet connections there is provided a seat 5 with which cooperates a valve 6. The valve is shown as being of the disk type normally urged in one direction by a spring 7 operative at one end directly against the valve and at its opposite end against the underside of a closure 8. In the embodiment of the invention illustrated, the spring is effective for urging the valve toward its seat for cutting off communication between the inlet and outlet connections.

Extending transversely through the casing 2 is a pivot 9 forming a mounting for a valve operating lever 10. With the parts assembled, one end of the lever 10 directly underlies a projection 11 on the valve, the relationship being such that if the lever is swung in a counter-clockwise direction as viewed in Figure 1 of the drawing, the valve will be moved away from its seat in opposition to the action of the spring 7.

The opposite end of the valve operating lever is shown as comprising bifurcations 12 each having a cylindrical seat 14 therein. Cooperating with the seats is a substantially spherical head 15 carried by a relatively non-expansible rod 16. This construction constitutes in effect a ball and cylindrical socket connection between the rod 16 and the lower end of the lever whereby the lever may be freely moved in either direction in accordance with corresponding movements of the rod. For guiding the rod during its reciprocal movements, the casing 2 is provided with a suitable guide opening 17.

Screwed into a projection 18 on the valve casing in substantially concentric relationship to the relatively non-expansible rod 16 is a tube 19 having a relatively high coefficient of expansion. Such a tube may be conveniently constructed of copper, as is well understood in the art.

The relative dimensions of the tube and rod are such as to provide a substantial space 20 therebetween, through which space gas may be conveyed from the interior of the projection to a burner tip 21 carried by the tube. For supplying gas to the projection I have herein illustrated the same as provided with a threaded opening 22 in which a suitable gas delivery pipe may be secured.

For operatively connecting the relatively expansible and non-expansible members, I have illustrated the rod as provided with a groove 23 into which a portion of the tubing may be compressed whereby contraction and expansion of the tube will be effective for moving the rod and therefore the valve operating lever 10.

With the construction illustrated, it may be assumed that the gas issuing from the burner tip 21 is ignited so that a portion of the heat is transmitted to the tube 19. This heat will be effective for expanding the tube and thereby, through its connection with the rod 16, of moving the rod to the right as viewed in Figure 1, and thereby lifting the valve from its seat. This condition will continue so long as the flame continues to burn. Upon extinguishing the flame, however, the tube 19 will cool and contract, and therefore move the valve operating lever 10 in the opposite direction to permit the valve to close against its seat and cut off communication between the inlet and outlet connections.

By the provision of a substantially universal connection between the rod and the valve operating lever, any tendency toward binding is effectively prevented, and the desired operative movements of the heat responsive mechanism transmitted to the parts controlled thereby. It will be noted that the cylindrical socket has a similar function as a pin and slot connection, thus allowing the head to have rectilinear motion while the depending portion of the lever has arcuate motion.

The form of the invention just described is suitable particularly for installations in which the thermostatic valve is located at one side of the unit being controlled. In many cases it is desirable to position it directly below such unit, and in such case the burner tip 21' will be applied to the tube 19' in the manner illustrated more particularly in Figure 4 of the drawing. Otherwise the features and constructional characteristics will be the same as those illustrated in Figure 1.

In Figure 5 there is illustrated a slightly modified form of the invention in which the disk valve 6 of Figure 1 is replaced by a slide valve 24 having openings 25 adapted to cooperate with inlet openings 26 in a casing 27. The upper end of the valve lever 28 is extended and provided with a head having a substantially spherical end portion 29 fitting a corresponding seat in the underside of the slide valve. The lever is also provided with a shoulder 30 against which bears one end of a spring 31, the opposite end underlying the slide valve and maintaining it against its seat. In this construction, as the lever 28 rocks in one direction or the other about its pivotal mounting 32, the openings 25 and 26 will be brought more nearly into, or moved out of registration, thereby controlling the flow through the valve.

In Figure 6 there is shown a casing 33 having an inlet 34 for one fluid and an inlet 35 for a second fluid, these inlets communicating respectively with ports 36 and 37. Cooperating with these ports is a slide valve 38 similar to the valve 24 and operated in the same manner. With this construction, as the valve lever 39 moves to the right as viewed in Figure 6, the quantity of fluid supplied to the port 36 will increase gradually while the quantity of fluid supplied through the port 37 will decrease. Upon movement in the opposite direction the reverse condition will take place, thus enabling the valve to serve as a mixing device or control device for a plurality of different fluids.

Further advantages arise from ease of assembly of the parts, since the tube 19 may be screwed into the projection 18, thus bringing the head 15 beneath the valve chamber. The lever 10 may be inserted through the valve chamber (the closure 8 and valve 6 being at this time removed) so as to make connection with the rod 16, the spherical head 15 sliding upwardly in the cylindrical socket. With the lever 10 in position, the pivot pin 9 can be readily slipped through the valve casing and through the lever 10. With the parts assembled, disengagement thereof is prevented.

While I have herein illustrated the connecting means as embodied in a so-called pilot control valve, it will be apparent that operating means of this character may be utilized in valves of a wide variety of different types, and that other changes in the construction and operation herein described may be made without departing either from the spirit of my invention or the scope of my broader claims.

I claim:

1. As an article of manufacture, a valve casing, a valve therein, a valve operating lever operably connected to said valve, and heat responsive mechanism including an element movable lengthwise for rocking said lever and a guide for an end of said element, said end of said element being coupled to said lever by a ball and cylindrical socket connection.

2. As an article of manufacture, a valve casing, a valve therein, a valve operating lever operably connected to said valve, and actuating means for said lever including a rod reciprocable longitudinally of its axis and a guide for an end of said rod, said end of said rod being coupled to said lever by a ball and cylindrical socket connection.

3. A thermostatic valve comprising a valve casing, a valve therein, a valve operating lever operably connected to said valve, actuating means for rocking said lever including an element movable lengthwise, and a guide for one end of said element, said end being coupled to said lever by a ball and cylindrical socket connection.

4. As an article of manufacture, a valve casing, a valve therein, heat responsive means for operating said valve including a rod movable lengthwise of its axis, a guide for an end of said rod, and means having a ball and cylindrical socket connection with said end of said rod for operably connecting said rod to said valve.

JOHN J. KENNEY.